US012726518B2

(12) United States Patent
Nanney et al.

(10) Patent No.: US 12,726,518 B2
(45) Date of Patent: Sep. 1, 2026

(54) HONEYPOTTED FILE DETECTION

(71) Applicant: Bank of America Corporation, Charlotte, NC (US)

(72) Inventors: Eric C. Nanney, Tinley Park, IL (US); Benjamin Tweel, Romeoville, IL (US); Pamela Wilson, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 18/530,788

(22) Filed: Dec. 6, 2023

(65) Prior Publication Data

US 2025/0193239 A1 Jun. 12, 2025

(51) Int. Cl.
*H04L 9/40* (2022.01)

(52) U.S. Cl.
CPC ...... *H04L 63/1491* (2013.01); *H04L 63/1416* (2013.01)

(58) Field of Classification Search
CPC ........................ H04L 63/1491; H04L 63/1416
See application file for complete search history.

(56) References Cited

U.S. PATENT DOCUMENTS 11,050,787 B1 6/2021 Sharifi Mehr
11,611,586 B2 3/2023 Strogov et al.
11,818,172 B1 * 11/2023 Miretsky ............. H04L 63/1408
2021/0216630 A1 * 7/2021 Karr ..................... H04L 63/1416
2024/0364740 A1 * 10/2024 Ezrielev .............. H04L 63/1416
2025/0141896 A1 * 5/2025 Thomas .............. H04L 63/1416
2025/0175498 A1 * 5/2025 Strogov .............. H04L 63/1491

FOREIGN PATENT DOCUMENTS

CN 111800407 B * 12/2022 ............. H04L 63/20
WO WO-2021181391 A1 * 9/2021 ........... H04L 67/535

OTHER PUBLICATIONS

English language transalation of Chinese Patent CN-111800407-B (12 pages) (Year: 2020).*

* cited by examiner

*Primary Examiner* — Amir Mehrmanesh
*Assistant Examiner* — Thomas A Gyorfi
(74) *Attorney, Agent, or Firm* — Banner & Witcoff, Ltd.

(57) ABSTRACT

A computing platform may train a machine learning model to detect and analyze threat actor activities. The computing platform may generate dynamic honeypotted files and deploy the generated dynamic honeypotted files as adaptive defenses to threat actors in a computing environment. The computing platform may adapt to threat actor activities based on analyzed behavior of the threat actor and any identified tools used by the threat actor to gain access to the computing system. Threat actor activities may be written to a blockchain to publicly record all transactions related to a threat actor's activities for analysis and generation of adaptive defenses to threat actor attacks. The computing platform may cause redirection of the threat actor into a specific computing environment through generation and deployment of dynamic honeypotted files.

17 Claims, 8 Drawing Sheets

HONEYPOTTED FILE DETECTION

BACKGROUND

Aspects of the disclosure relate to electrical computers, systems, and devices for generating dynamic honeypotted files and deploying the generated dynamic honeypotted files as an adaptive defense to threat actors in a computer environment. The generated dynamic honeypotted files may further include unique indicators for tracking.

Enterprise computer systems may be subject to a large number of data entry attacks, such as malware, computer viruses, worms, Trojan horses, ransomware, spyware, adware, scareware, phishing, fraud, and/or other potentially harmful schemes that may be either the same as or similar to data entry attacks being utilized by threat actors. In some cases, these data entry attacks may be initiated via executable code that may be accessed via a link or may be embedded in an attachment (e.g., documents, slide decks, spreadsheets, and the like). In some cases, the executable code may be benign and used to provide known and useful functionality that may be, for example, associated with a corresponding html page, document or other such file. However, in some cases, the executable code may be designed to perform some malicious activity to leverage a vulnerability of the enterprise network. In some cases, malicious code may be disguised as benign code and/or may be otherwise hidden so that when an application is launched, a webpage accessed, the malicious code may run in the background unnoticed until too late.

Moreover, enterprise computing systems (e.g., educational institution computing systems, corporate computing systems, financial institution computing systems, government computing systems and the like) may be constantly bombarded with data, both legitimate and illegitimate. In some cases, unauthorized individuals and/or threat actors may attempt to gain access into the enterprise computing system from any number of external sources, such as via email attachments, web browser provided links, and the like. With current technology solutions, threat control teams have difficulty in providing computing systems to prevent threat actors from bypassing network border controls attempting to obtain unauthorized access to the protected enterprise networks. Regardless of the tools implemented, threat mitigation controls tend to focus on closing or at least identifying a specific gap in the implemented security measures and then preventing those gaps from being misused.

In some instances, static honeypots may be deployed to detect, deflect, or counteract attempts by threat actors to infiltrate enterprise organization computing systems and compromise confidential or proprietary information. These static honeypots may create false sets of data that appear to the threat actor as being an authentic part of the enterprise organizations confidential or proprietary information. However, these static honeypots do not adapt to protect the enterprise organization computing systems. In addition, existing static honeypots often take an excessive amount of time to create and deploy into computing networks. What is needed is a system that provides a dynamic adaptive defense against threat actors. The system should be able to track information related to the threat activity.

SUMMARY

Aspects of the disclosure provide effective, efficient, scalable, and convenient technical solutions that address and overcome the technical problems associated with providing deterrence, adaptive defense, and intelligence gathering on threat actors and their associated threat activities in a computing environment. A computing platform may train a machine learning model to detect and analyze threat actor activities. The computing platform may generate dynamic honeypotted files and deploy the generated dynamic honeypotted files as adaptive defenses to threat actors in a computing environment. The computing platform may adapt to threat actor activities based on analyzed behavior of the threat actor and any identified tools used by the threat actor to gain access to the computing system. Threat actor activities may be written to a blockchain to publicly record all transactions related to a threat actor's activities for analysis and generation of adaptive defenses to threat actor attacks.

In an embodiment, the computing platform may cause redirection of the threat actor into a specific computing environment through generation and deployment of dynamic honeypotted files.

In one or more instances, training the machine learning model may include using historical threat occurrence information (e.g., what was accessed, where it was accessed from, communication information, how often information was accessed, and/or other information). In some instances, this information may be labelled based on whether or not the corresponding threat occurrence information was ultimately identified as corresponding to a threat actor.

In one or more instances, generated dynamic honeypotted files may be deployed into a sandbox environment within the enterprises computing network. The deployment of the generated dynamic honeypotted files into the sandbox environment may entice the threat actor into the sandbox environment. In these instances, the sandbox environment may isolate and allow for further analysis of a threat actor's patterns or tactics for additional insights and system security.

BRIEF DESCRIPTION OF DRAWINGS

The present disclosure is illustrated by way of example and is not limited in the accompanying figures in which like reference numerals indicate similar elements and in which:

FIGS. 3-4 depict illustrative user interfaces for generating and deploying dynamic honeypots in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to dynamic honeypot generation and deployment to protect an enterprise organizations computing systems. These and other features are described in greater detail below.

Figure 1A:
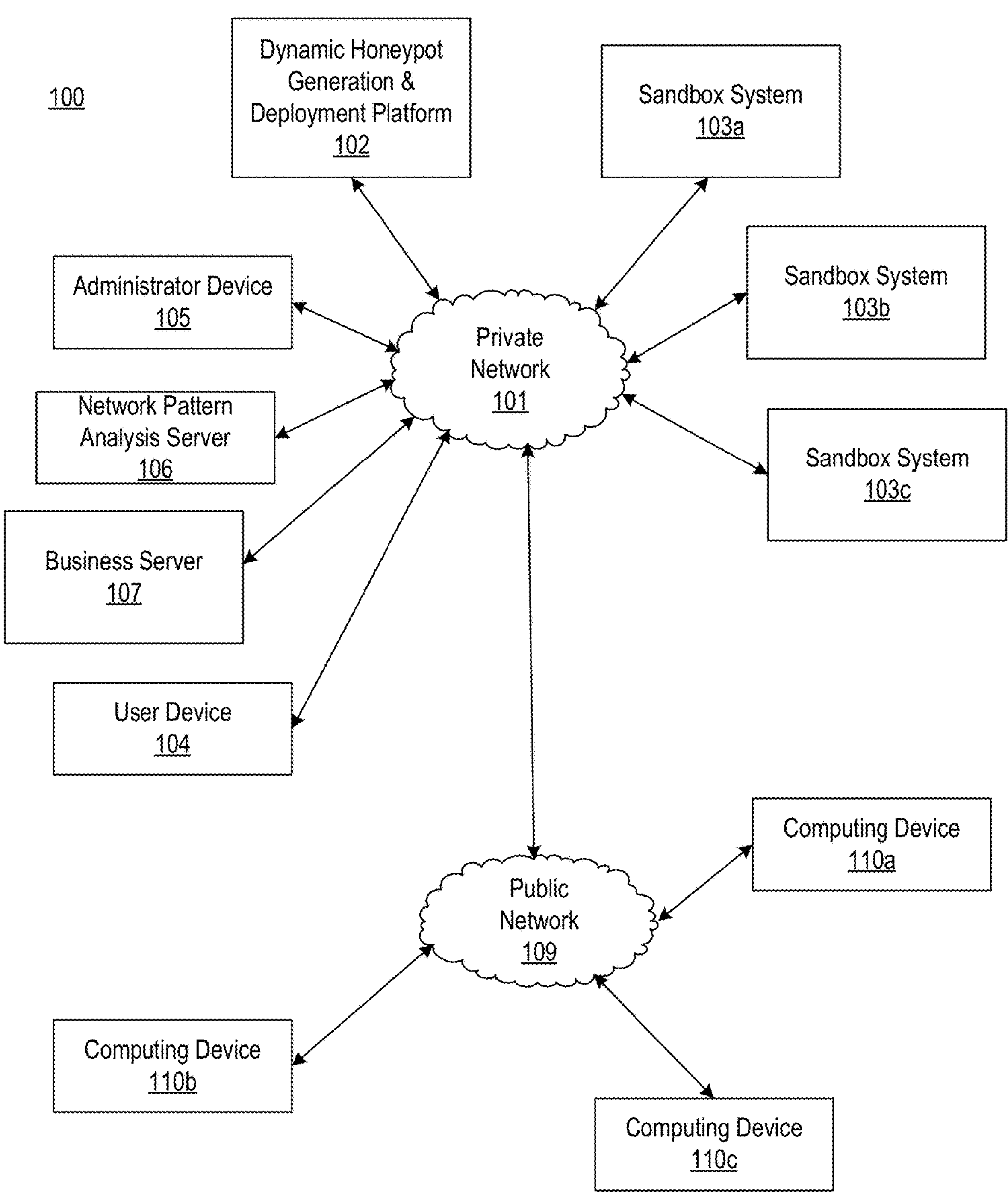
FIGS. 1A and 1B depict an illustrative computing environment for generating and deploying dynamic honeypots in accordance with one or more example embodiments.
Figure 1B:
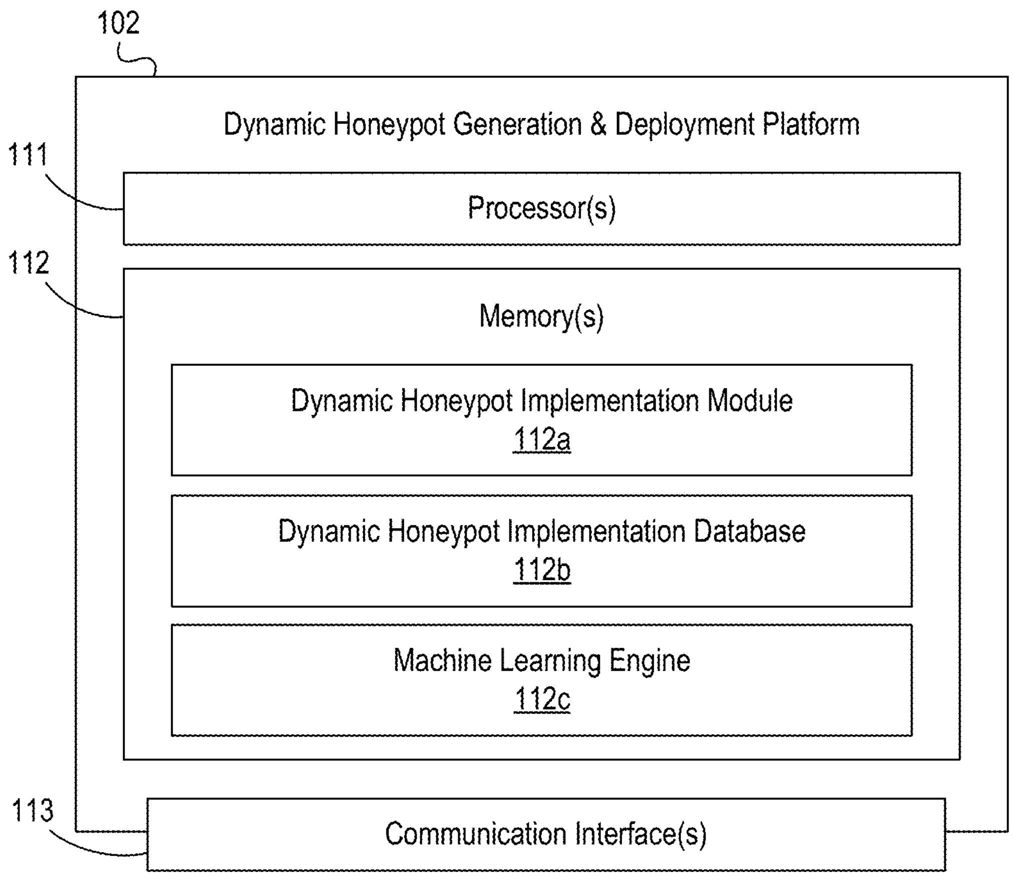

FIGS. 1A-1B depict an illustrative computing environment for dynamic honeypot generation and deployment in accordance with one or more example embodiments. Referring to FIG. 1A, computing environment 100 may include one or more computer systems. For example, computing environment 100 may include dynamic honeypot generation and deployment platform 102, sandbox systems 103*a*, 103*b*, and 103*c*, user device 104, administrator device 105, network pattern analysis server 106, business server 107, and computing devices 110*a*, 110*b*, and 110*c*. The above systems and devices may be communicatively coupled via one or more computing networks (e.g., private network 101, public network 109, and the like).

Dynamic honeypot generation and deployment platform 102 may include one or more computing devices (servers, server blades, or the like) and/or other computer components (e.g., processors, memories, communication interfaces, or the like). For example, the dynamic honeypot generation and deployment platform 102 may include a number of server endpoints, and may be configured to monitor potential threat actor activity at these endpoints. In some instances, the dynamic honeypot generation and deployment platform 102 may further be configured to train, host, and execute a machine learning model to monitor, evaluate, and generate dynamic honeypots in response to detection and activity of threat actors on private network 101. In some embodiments, an entire originations computing network may be fully or partially replicated with dynamic honeypots to simulate the full production environment of the enterprise. In some embodiments, dynamic honeypot generation and deployment platform 102 may determine which portions of an enterprises computing network should be replicated. In another embodiment, dynamic honeypot generation and deployment platform 102 may include a library of environments that may be created or used based on AI model output of threat activities.

In another aspect of the disclosure, dynamic honeypot generation and deployment platform 102 may generate honeypotted files. Dynamic honeypot generation and deployment platform 102 may embed identifying features into the generated dynamic honeypotted files. For instance, the honeypotted files may include at least one embedded unique identifying feature. In an embodiment, any activity related to access of the honeypotted file may be written to public or private blockchain. The blockchain may capture all identifiable features regarding access of the honeypotted file. The identifiable features may include IP addresses of file location, computing device identification information such as computing device name (i.e., machine identifier), operating system type and version, and computer microprocessor identifiable information, and the like.

In another aspect of the disclosure, any usage of the honeypotted file may also be written to the blockchain. As the honeypotted file is used, the location and all information related to the usage of the honeypotted file may be written to blocks on the blockchain.

Sandbox systems 103*a*, 103*b*, and 103*c* may include one or more computing devices (servers, server blades, or the like) and/or other computer components (e.g., processors, memories, communication interfaces, or the like). In some instances, the sandbox systems 103*a*, 103*b*, and 103*c* may be configured to include honeypot environments which replicate and simulate an enterprise organizations complete or partial computer systems. The dynamic honeypot generation and deployment platform 102 may entice threat actors to sandbox systems 103*a*, 103*b*, and 103*c*. In these instances, the sandbox systems 103*a*, 103*b*, and 103*c* may isolate and/or otherwise analyze a threat actor's patterns or tactics for additional insights and system security. In some instances, the secure sandbox systems 103*a*, 103*b*, and 103*c* may be separate from the dynamic honeypot generation and deployment platform 102. In other instances, the sandbox systems 103*a*, 103*b*, and 103*c* may be integrated into the dynamic honeypot generation and deployment platform 102.

Insights that may be determined from analysis of the threat actor's patterns or tactics may be used to train the machine learning model and internal cyber security personnel. The learning may lead to the generation of more realistic and enticing environments and/or dynamic honeypots. For instance, dynamic honeypots provide real-time adaptive threat protection that may be generated with specific purpose based on threat activity analysis. The additional insights may assist in generating specific purpose dynamic honeypots.

User device 104 may be or include one or more devices (e.g., laptop computers, desktop computer, smartphones, tablets, and/or other devices) configured for use in conducting business on behalf of the enterprise organization. In some instances, the user device 104 may be operated by an employee of the enterprise organization. In some instances, the user device 104 may be configured to display graphical user interfaces (e.g., information interfaces, or the like). Any number of such user devices may be used to implement the techniques described herein without departing from the scope of the disclosure.

Administrator device 105 may be or include one or more devices (e.g., laptop computers, desktop computer, smartphones, tablets, and/or other devices) configured for use in providing information security. For example, the administrator device 105 may be used by an employee of an organization (e.g., such as an organization corresponding to the dynamic honeypot generation and deployment platform 102). In some instances, the administrator user device 105 may be configured to display graphical user interfaces (e.g., honeypot generation and deployment implementation interfaces, access monitoring summary interfaces, or the like). Any number of such user devices may be used to implement the techniques described herein without departing from the scope of the disclosure.

Network platform analysis server 106 may monitor and analyze activities for the computing environment 100. The network pattern analysis server 106 may include an AI engine processing an AI model that may be trained (continually trained, periodically trained) based on the common activity patterns to allow the network pattern analysis engine to remove or otherwise filter the common activity patterns from analysis to efficiently identify abnormal or unusual activity patterns indicative of potential malicious attempts to gain access to the enterprise network.

Activity patterns aggregated from computing devices across the network, including from the network pattern analysis server 106 may be stored in the database, along with the AI model. A network pattern analysis engine (as part of network pattern analysis server 106), once the baseline commonly used activity patterns are filtered from monitoring operations, may identify unusual or unexpected activity patterns that may indicate an attempt to breach into the network and may continually learn and adapt based on each successive analysis. The network pattern analysis engine 106 may be able to identify a targeted attack, such as those focused on a specific computing device from an outside threat actor by analyzing unusual or unexpected activities that may indicate that an advanced threat actor that is trying, for example, to identify network identification information to bypass security measures, leverage known operating system vulnerabilities, and/or to identify when applications or scripts attempt to invoke functionality subject to the vulnerabilities.

Business server 107 may be or include one or more devices (e.g., laptop computers, desktop computers, smartphones, tablets, and/or other devices) configured for use in conducting enterprise business. Numerous business servers along with business server 107 may be networked to provide applications and information to users of the enterprise organization.

In one or more arrangements, dynamic honeypot generation and deployment platform 102, sandbox systems 103*a*, 103*b*, and 103*c*, user device 104, administrator device 105, network pattern analysis server 106, and business server 107 may be any type of computing device capable of receiving a user interface, receiving input via the user interface, and communicating the received input to one or more other computing devices. For example, dynamic honeypot generation and deployment platform 102, sandbox systems 103*a*, 103*b*, and 103*c*, user device 104, administrator device 105, network pattern analysis server 106, and business server 107 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic honeypot generation and deployment platform 102, sandbox systems 103*a*, 103*b*, and 103*c*, user device 104, administrator device 105, network pattern analysis server 106, and business server 107 may, in some instances, be special-purpose computing devices configured to perform specific functions.

Referring to FIG. 1B, dynamic honeypot generation and deployment platform 102 may include one or more processors 111, memory 112, and communication interface 113. A data bus may interconnect processor 111, memory 112, and communication interface 113. Communication interface 113 may be a network interface configured to support communication between dynamic honeypot generation and deployment platform 102 and one or more networks (e.g., network 101, or the like). Memory 112 may include one or more program modules having instructions that when executed by processor 111 cause dynamic honeypot generation and deployment platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic honeypot generation and deployment platform 102 and/or by different computing devices that may form and/or otherwise make up dynamic honeypot generation and deployment platform 102. For example, memory 112 may have, host, store, and/or include dynamic honeypot implementation module 112*a*, dynamic honeypot implementation database 112*b*, and machine learning engine 112*c*. Dynamic honeypot implementation module 112*a* may have instructions that direct and/or cause dynamic honeypot generation and deployment platform 102 to execute advanced techniques to detect threat actors and implement security measures accordingly. Dynamic honeypot database 112*b* may store information used by dynamic honeypot module 112*a*, in performing threat actor detection, dynamic honeypot implementation, and/or in performing other functions. Machine learning engine 112*c* may be used to train, deploy, and/or otherwise refine models used to support functionality of the dynamic honeypot implementation module 112*a* through both initial training and one or more dynamic feedback loops, which may, e.g., enable continuous improvement of the dynamic honeypot generation and deployment platform 102 and further optimize the detection of threat actor activity.

Figure 2A:
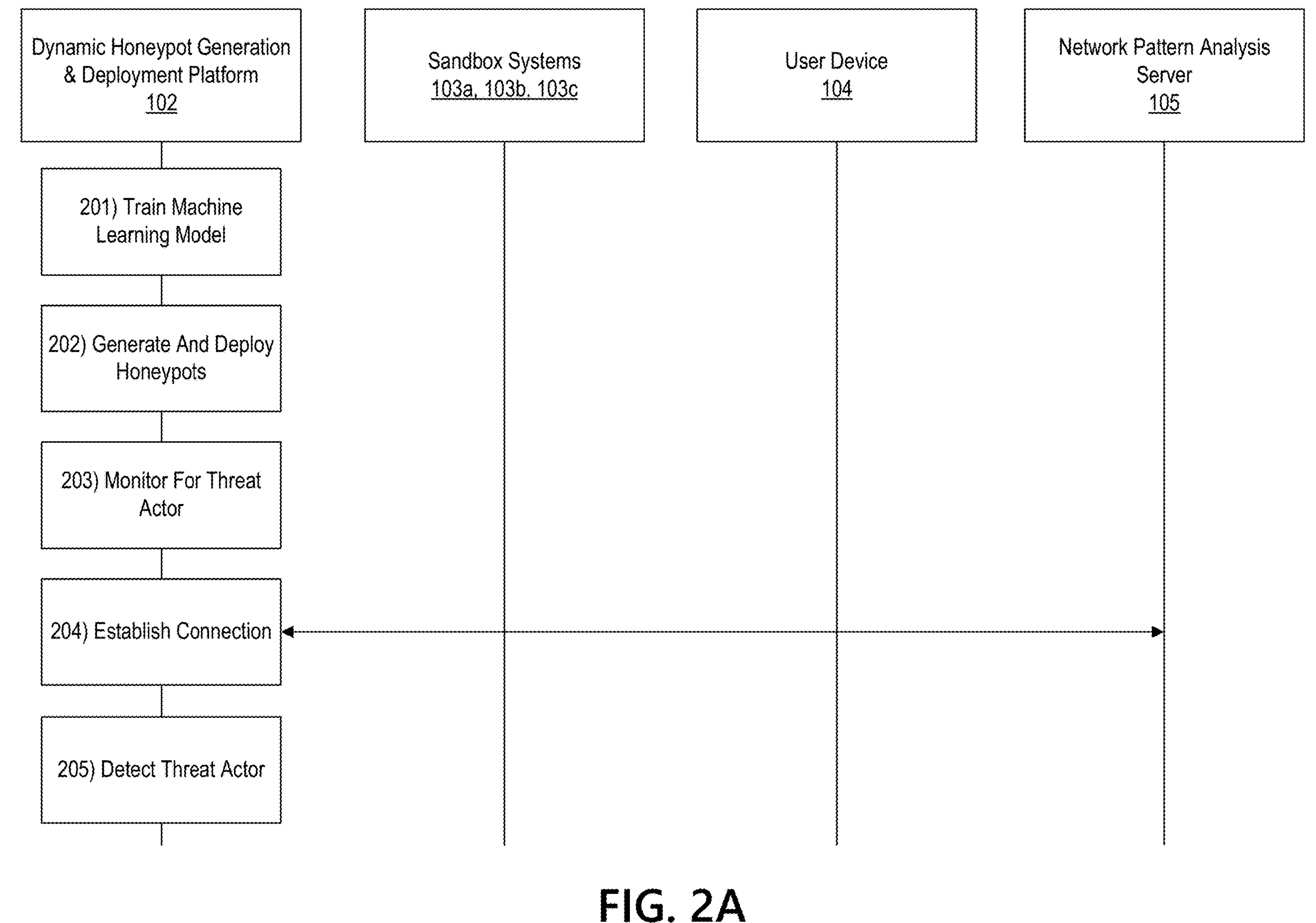
FIGS. 2A-2B depict an illustrative event sequence for generating and deploying dynamic honeypots in accordance with one or more example embodiments.
Figure 2B:
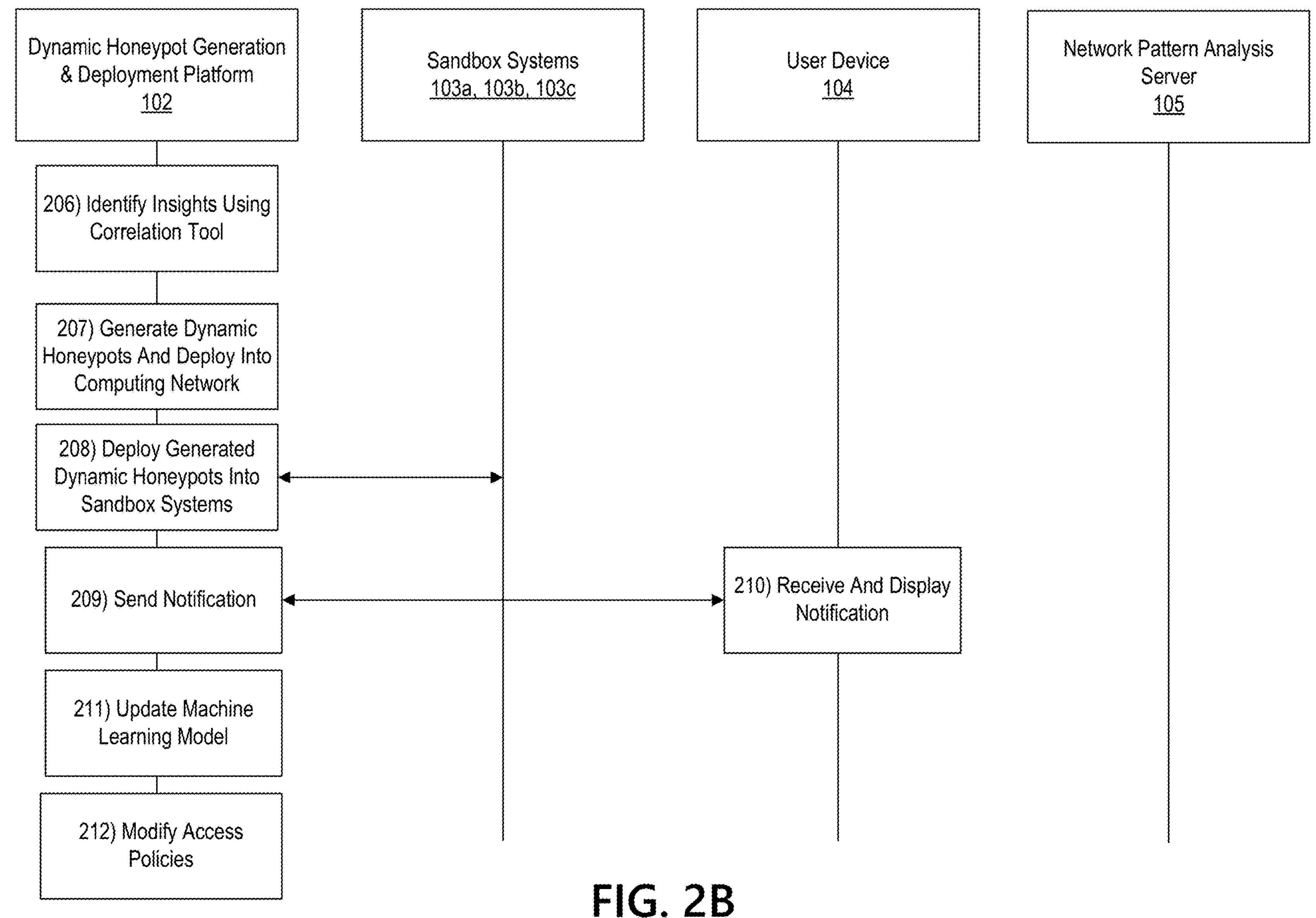

FIGS. 2A-2B depict an illustrative event sequence for implement generation of dynamic honeypots into a computer network in accordance with one or more example embodiments. Referring to FIG. 2A, at step 201, the dynamic honeypot generation and deployment platform 102 may train a machine learning model for threat actor detection. For example, the dynamic honeypot generation and deployment platform 102 may receive historical pattern information (e.g., what was accessed, where it was accessed from, communication information, how often information was accessed, and/or other information). In some instances, this information may be labelled based on whether or not the corresponding pattern was ultimately identified as corresponding to a threat actor.

In some instances, the dynamic honeypot generation and deployment platform 102 may also train the machine learning model using identified threat actor event occurrences. Information regarding each identified threat actor event occurrence may include information such as traffic logs, activity patterns, artifacts, behavioral information, scope of compromise, statistics, tools detected, third party resource information, and any determined tactics, techniques, or procedures used by the threat actor, or the like.

In some instances, in training the machine learning model, dynamic honeypot generation and deployment platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neural networks, and/or other unsupervised models/techniques), and/or other techniques.

At step 202, the dynamic honeypot generation and deployment platform 102 may generate honeypots and deploy the generated honeypots into the enterprises computing environment. For instance, dynamic honeypot generation and deployment platform 102 may inject and/or otherwise incorporate decoy information into the internal information storage systems along with the internal information, which may, for example, act as noise to disrupt and/or otherwise obscure the internal information. For example, the dynamic honeypot generation and deployment platform 102 may implement simulated increases in computer processing power correlated to stock trades for a given company, information corresponding to market movers, or the like. In these instances, such decoy information might not otherwise be distinguishable from the legitimate internal information.

In another embedment, dynamic honeypot generation and deployment platform 102 may create environments based on detected threat activity. For instance, an AI model of the dynamic honeypot generation and deployment platform 102 may determine that different environments are needed for a password login attempt attack, a detected remote code execution attack, and/or a suspicious lateral movement detection. In an embodiment, the dynamic honeypots generated and deployed may be different in each of those attack scenarios In another example, dynamic honeypot generation and deployment platform 102 may generate a honeypot that represents a server with an open proxy configuration. The honeypot may entice a threat actor to focus their attention on what the threat actor perceives as a server with a misconfigured HTTP proxy.

At step 203, dynamic honeypot generation and deployment platform 102 may monitor the enterprise network for detection of a threat actor. For example, dynamic honeypot generation and deployment platform 102 may monitor for internal network anomalies. In an embodiment, dynamic honeypot generation and deployment platform 102 may establish a data connection with network pattern analysis server 105 in step 204 to look for abnormal network patterns for use in detection of threat actor activity.

At step 205, the dynamic honeypot generation and deployment platform 102 may detect activity related to a threat actor. Dynamic honeypot generation and deployment platform 102 may collect and analyze all data associated with the threat actor. For example, the dynamic honeypot generation and deployment platform 102 may identify what information is being accessed, when they are accessing it, where they are accessing it from, if they are notifying and entities of the access, and/or other information corresponding to patterns of information access.

Referring to FIG. 2B, at step 206, dynamic honeypot generation and deployment platform 102 may attempt to identify insights using a correlation tool. For example, dynamic honeypot generation and deployment platform 102 may feed the internal information, obtained at step 204, into the correlation tool to attempt to identify behavioral patterns of the threat actor. In addition, the correlation tool may also determine the type of attack being used, and any tools being used by the threat actor.

At step 207, dynamic honeypot generation and deployment platform 102 may generate dynamic honeypots based on the determined insights. For instance, dynamic honeypot generation and deployment platform 102 may generate dynamic honeypots based the scanning tool being used by the threat actor. For example, if it is determined that the threat actor is using a port detection tool, dynamic honeypot generation and deployment platform 102 may generate dynamic honeypots having open ports and strategically placing those generated dynamic honeypots in specific locations in the enterprise computing network. In another embodiment, if it is determined that the threat actor is using a missing patch scanner detection tool, dynamic honeypot generation and deployment platform 102 may generate dynamic honeypots having missing software patches and strategically place those generated dynamic honeypots in specific locations in the enterprise computing network. In yet another embodiment, if it is determined that the threat actor is scanning for missing signatures using a detection tool, dynamic honeypot generation and deployment platform 102 may generate dynamic honeypots having missing signatures and strategically place those generated dynamic honeypots in specific locations in the enterprise computing network.

At step 208, dynamic honeypot generation and deployment platform 102 may locate generated dynamic honeypots into a sandbox system such as sandbox systems 103*a*, 103*b*, and/or 103*c*. Sandbox systems 103*a*, 103*b*, and 103*c* may include different operating embodiments all similar to portions of an enterprise organizations production computing environment.

The sandbox systems 103*a*, 103*b*, and/or 103*c* may be designed to be indistinguishable from the enterprises production computing environment by a threat actor. In an aspect of the disclosure, threat actors may be enticed and redirected to the sandbox systems 103*a*, 103*b*, and/or 103*c* by placement of the generated dynamic honeypots into one or all of the sandbox systems 103*a*, 103*b*, and/or 103*c*.

Figures 3, 4:
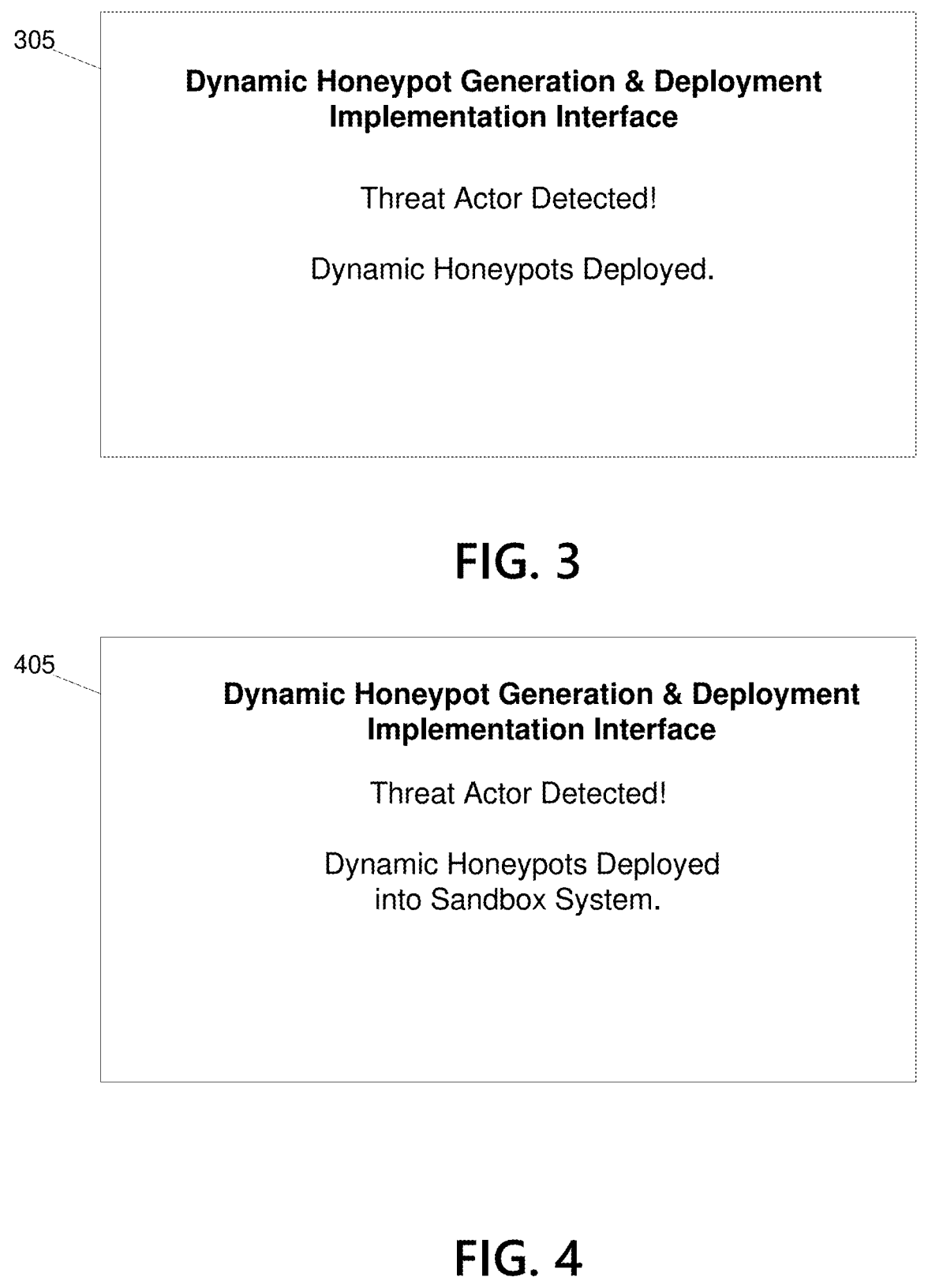

At step 209, the dynamic honeypot generation and deployment platform 102 may send a honeypot deployment notification to user device 104 and administrator device 105. For example, the dynamic honeypot generation and deployment platform 102 may send the honeypot deployment notification to user device 104 and/or administrator device 105 via the communication interface. In some instances, the dynamic honeypot generation and deployment platform 102 may also send one or more commands directing the administrator device 105 to display the honeypot deployment notification (e.g., via a dynamic implementation interface), at step 210. For example, the administrator device 105 or user interface 104 may display a graphical user interface similar to graphical user interfaces 305 or 405, as illustrated in FIGS. 3 and 4.

In some instances, the honeypot deployment notification may be generated and/or otherwise sent via a reporting system integrated into the dynamic honeypot generation and deployment platform 102 and/or other device. In these instances, honeypot deployment notification may correspond to a dynamic honeypot implementation interface that includes a summary of the results of threat actor detection.

At step 211, the dynamic honeypot generation and deployment platform 102 may update the machine learning model based on the threat action detection and the dynamic honeypot generation and deployment. In doing so, the dynamic honeypot generation and deployment platform 102 may continue to refine the machine learning model using a dynamic feedback loop, which may, e.g., increase the accuracy and effectiveness of the model in identifying future threat actors. For example, the dynamic honeypot generation and deployment platform 102 may reinforce, modify, and/or otherwise update the machine learning model, thus causing the model to continuously improve identifying future threat actors and generating future dynamic honeypots.

At step 212, the dynamic honeypot generation and deployment platform 102 may modify access policies for users and/or devices to ensure that users or devices do not interact with threat actors and associated threat actor activities.

Figure 5:
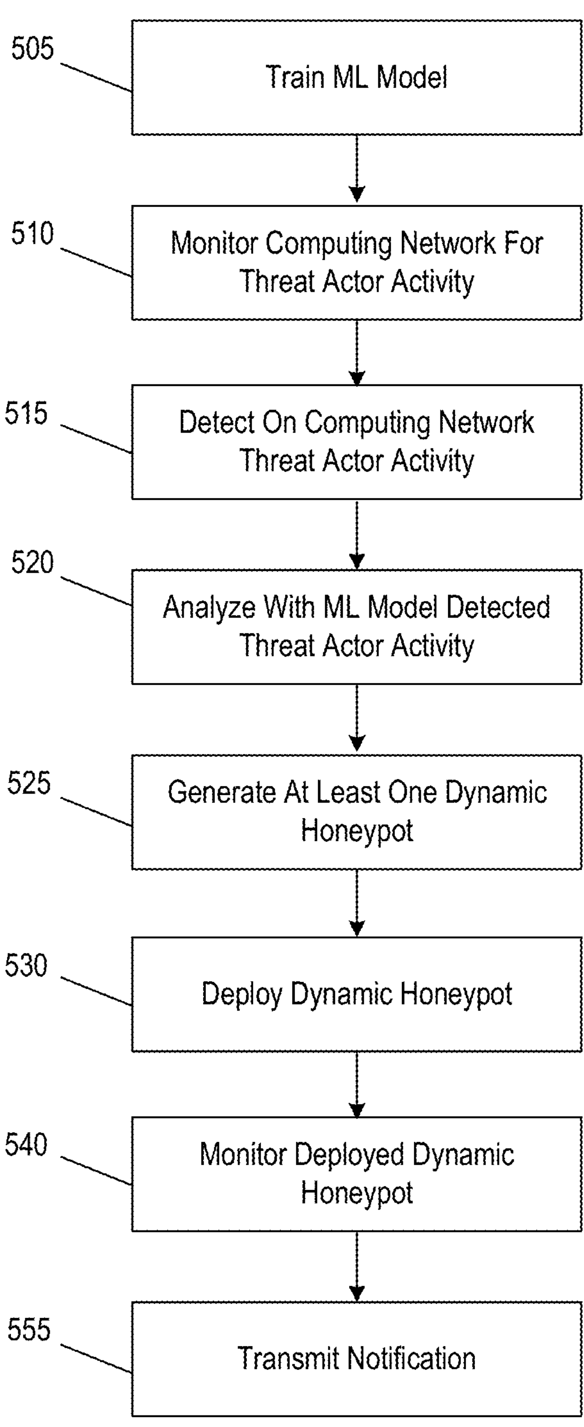
FIG. 5 depicts an illustrative method for generating and deploying dynamic honeypots in accordance with one or more example embodiments.

FIG. 5 depicts an illustrative method for generating and deploying dynamic honeypots in accordance with one or more example embodiments. Referring to FIG. 5, dynamic honeypot generation and deployment platform 102 may comprise one or more processors, memory, and a communication interface. At step 505, dynamic honeypot generation and deployment platform 102 may train a machine learning model to identify threat actor activity. For example, dynamic honeypot generation and deployment platform 102 may train the machine learning model using historical information such as identified threat actor event occurrences. Information regarding each identified threat actor event occurrence may include information such as traffic logs, activity patterns, artifacts, behavioral information, scope of compromise, statistics, tools detected, third party resource information, and any determined tactics, techniques, or procedures used by the threat actor, or the like.

At step 510, dynamic honeypot generation and deployment platform 102 may monitor a computing network for threat actor activity. At step 515, dynamic honeypot generation and deployment platform 102 may detect threat actor activity on the computing network.

At step 520, dynamic honeypot generation and deployment platform 102 may analyze the detected threat actor activity with the machine learning model. For instance, dynamic honeypot generation and deployment platform 102 may feed the internal information, into a correlation tool to attempt to identify behavioral patterns of the threat actor. In an embodiment, the correlation tool may be part of the machine learning model. In addition, the correlation tool may also determine the type of attack being used and any tools being used by the threat actor.

At step 525, dynamic honeypot generation and deployment platform 102 may generate at least one dynamic honeypot based on the analyzed threat actor activity. For instance, dynamic honeypot generation and deployment platform 102 may generate dynamic honeypots based on the scanning tool being used by the threat actor.

At step 530, dynamic honeypot generation and deployment platform 102 may deploy the at least one generated dynamic honeypot into the computing network. In an embodiment, the deployment of the at least one generated dynamic honeypot may be into a sandbox of the computing environment. In an embodiment, deployment of the least one generated dynamic honeypot in the sandbox may entice the threat actor into at the sandbox environment. The sandbox environment may isolate and allow for further analysis of a threat actor's patterns or tactics for additional insights and system security. In an embodiment, after analysis or after a specific predetermined time period, the sandbox may be terminated to remove the threat actor associated with the threat activity. In another embodiment, the sandbox environment or any other unnecessary environment (i.e., training environment, virtual environment, and/or fake environment, etc . . . ), may be terminated on demand or based on any number of criteria such as number of page generations to remove the threat actor.

At step 540, dynamic honeypot generation and deployment platform 102 may monitor the deployed at least one dynamic honeypot for additional threat actor activity. At step 555, dynamic honeypot generation and deployment platform 102 may transmit a notification of the detection of the threat actor activity and the deployment of the at least one generated dynamic honeypot.

In an embodiment, dynamic honeypot generation and deployment platform 102 may input all additional discovered information regarding the threat activities into the machine learning model to update the machine learning model and to generate updated learnings.

Insights that may be determined from analysis of the threat actor's patterns or tactics may be used to train the machine learning model and internal cyber security personnel. The learnings may lead to the generation of more realistic and enticing environments and/or dynamic honeypots. For instance, dynamic honeypots provide real-time adaptive threat protection that may be generated with specific purpose based on threat activity analysis. The additional insights may assist in generating specific purpose dynamic honeypots.

Figure 6:
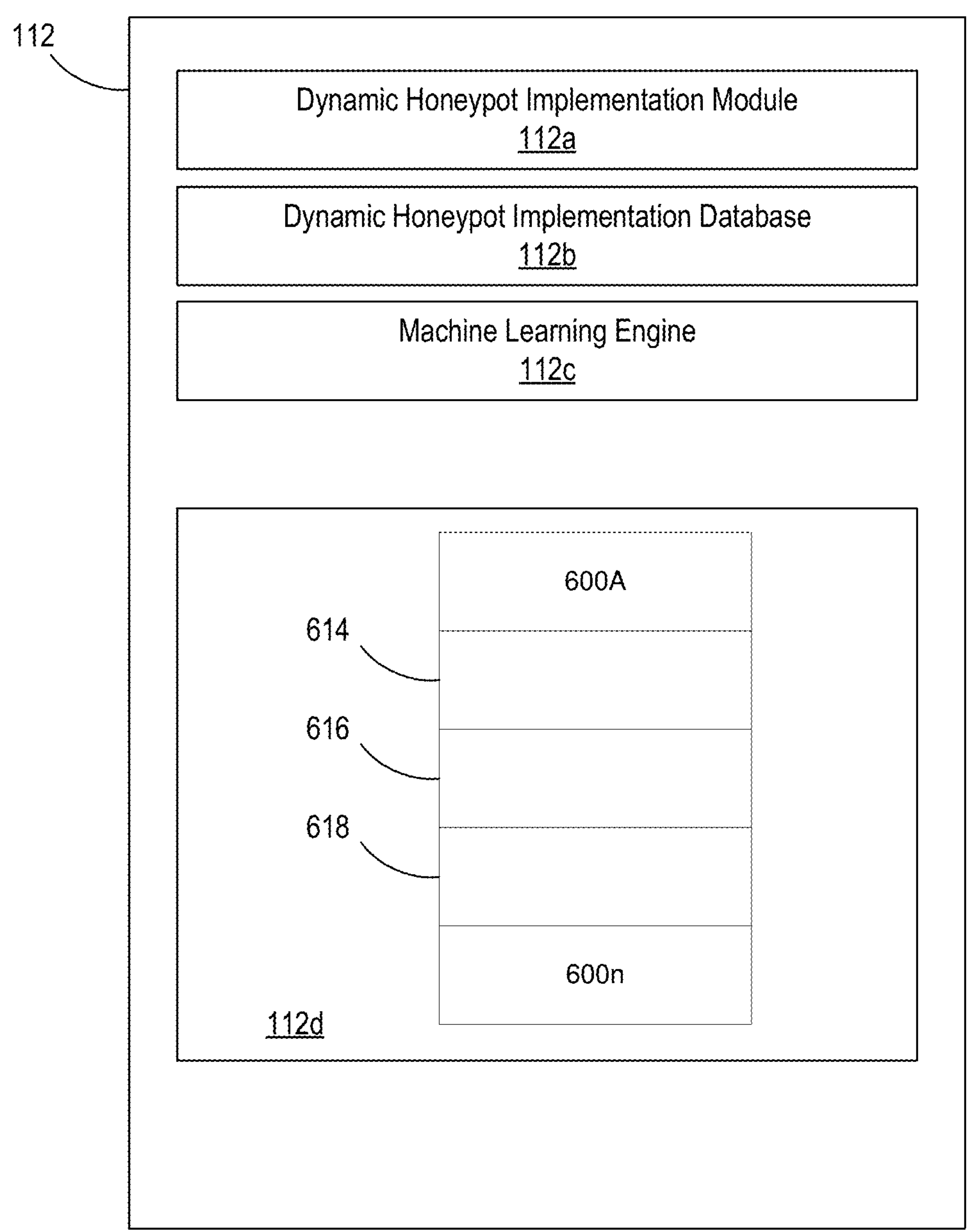
FIG. 6 illustrates a blockchain associated with the dynamic honeypot generation and deployment platform in accordance with one or more example embodiments.

FIG. 6 illustrates another embodiment of memory 112 which can be used in conjunction with FIGS. 1A and 1B as discussed above. FIG. 6 shows memory 112 also including a local copy of a blockchain 112*d* that may be used with various embodiments of the disclosure.

As illustrated in FIG. 6, blockchain 112*d* may be a chronological linkage of data elements (e.g., blocks) which store data records relating to the decentralized computing system. The data records in blockchain 112*d* may be in the form of transactions associated with the generated dynamic honeypotted files. In an embodiment, data records may correspond to any form of data that may be stored in a block. The data records stored in a block may be queried by dynamic honeypot generation and deployment platform 102.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application.

A "private blockchain" may refer to a blockchain of a decentralized private system in which only authorized computing devices are permitted to act as nodes in a decentralized private network and have access to the private blockchain. A "public blockchain" may refer to a blockchain of a decentralized public system in which any computing devices may be permitted to have access to the public blockchain.

As shown in FIG. 6, memory 112 of dynamic honeypot generation and deployment platform 102 may store blockchain 112*d*. Blockchain 112*d* stored in memory 112 of dynamic honeypot generation and deployment platform 102 may include at least block 600*n*, wherein block 600*n* represents the most immediate block of blockchain 112*d*.

In some instances, however, blockchain 112*d* may include blocks 600A, 614, 616, 618 . . . 600*n*, wherein block 600A represents the first block (e.g., genesis block) of blockchain 112*d* and block 600*n* represents the most immediate block of blockchain 112*d*. As such, the blockchain 112*d* may be a full or complete copy of the blockchain of the decentralized computing network. Each of the blocks within blockchain 112*d* may include information corresponding to threat actor activity discovered on various enterprise networks.

In an embodiment, dynamic honeypot generation and deployment platform 102 may continuously instruct a blockchain engine to generate additional data blocks based on receiving, from enterprise organization computing devices, additional threat actor activity data to be stored and the relationship between the data to be stored In an embodiment, blockchain 112*d* may capture all identifiable features regarding access of the honeypotted file. The identifiable features may include IP addresses of file location, computing device identification information such as computing device name (i.e., machine identifier), operating system type and version, and computer microprocessor identifiable information, and the like.

Figure 7:
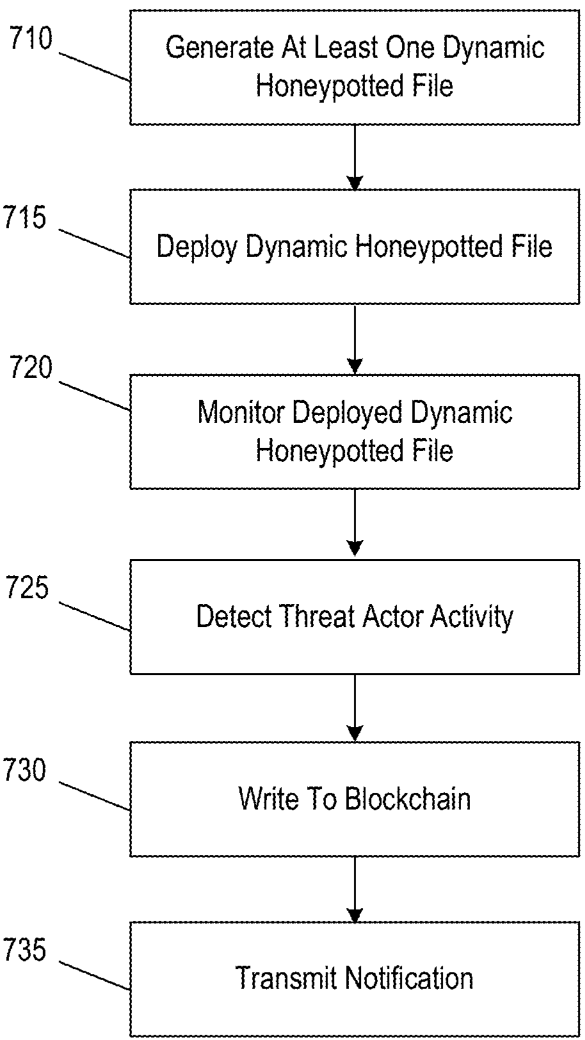
FIG. 7 depicts an illustrative method for generating and deploying dynamic honeypotted files in accordance with one or more example embodiments

FIG. 7 depicts an illustrative method for generating and deploying dynamic honeypotted files in accordance with one or more example embodiments. Referring to FIG. 7, dynamic honeypot generation and deployment platform 102 may comprise one or more processors, memory, and a communication interface. At step 710, dynamic honeypot generation and deployment platform 102 may generate at least one dynamic honeypotted file. The generated at least one dynamic honeypotted file may include at least on unique indicator embedded within the at least one generated dynamic honeypotted file.

At step 715, dynamic honeypot generation and deployment platform 102 may deploy the at least one generated dynamic honeypotted file into the computing network. In an embodiment, the deployment of the at least one generated dynamic honeypotted file may be into a sandbox of the computing environment. In an embodiment, deployment of the at least one generated dynamic honeypot in the sandbox may entice the threat actor into the sandbox environment. The sandbox environment may isolate and allow for further analysis of a threat actor's patterns or tactics for additional insights and system security. In an embodiment, after analysis or after a specific predetermined time period, the sandbox may be terminated to remove the threat actor associated with the threat activity. In another embodiment, the sandbox environment or any other unnecessary environment (i.e., training environment, virtual environment, and/or fake environment, etc . . . ), may be terminated on demand or based on any number of criteria such as number of page generations to remove the threat actor.

At step 720, dynamic honeypot generation and deployment platform 102 may monitor the deployed at least one dynamic honeypotted file for threat actor activity.

At step 725, dynamic honeypot generation and deployment platform 102 may detect threat actor activity associated with the at least one honeypotted file on the computing network.

In step 730, dynamic honeypot generation and deployment platform 102 may write information regarding the detection of the threat actor activity to a blockchain. In an embodiment, the information may include detailed data associated with the detection of the threat actor activity.

At step 735, dynamic honeypot generation and deployment platform 102 may transmit a notification of the detection of the threat actor activity and the deployment of the at least one generated dynamic honeypotted file.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

generate at least one dynamic honeypotted file, the at least one generated dynamic honeypotted file including at least one unique indicator embedded within the at least one generated dynamic honeypotted file, and wherein a machine learning model is trained using historical threat occurrence information including labelled data on whether access patterns correspond to threat actors;

deploy the at least one generated dynamic honeypotted file into a computing network;

monitor the deployed at least one generated dynamic honeypotted file for threat actor activity;

detect threat actor activity associated with the deployed at least one generated dynamic honeypotted file;

write information regarding the detection of the threat actor activity to a blockchain, the information including detailed data associated with the detection of the threat actor activity; and transmit a notification of the detection of the threat actor activity and the deployment of the at least one generated dynamic honeypotted file;

access the blockchain to retrieve information regarding access and usage of the generated dynamic honeypotted file;

analyze with a machine learning model the retrieved blockchain information regarding access and usage of at least one generated dynamic honeypotted file;

determine by the machine learning model a mapping of locations of the at least one generated dynamic honeypotted file, wherein the mapping includes geolocation information derived from the detailed data in the blockchain for the at least one generated dynamic honeypotted file and the computing device associated with the threat actor; and transmit a notification of the determined mapping of the location of the at least one generated dynamic honeypotted file.

2. The computing platform of claim 1, wherein the memory stores additional computer readable instructions that, when executed by the at least one processor, cause the computing platform to:

access the blockchain to retrieve information regarding access and usage of the generated dynamic honeypotted file;

analyze with a machine learning model the retrieved blockchain information regarding access and usage of at least one generated dynamic honeypotted file, wherein analyzing the retrieved blockchain information with the machine learning model identifies patterns in threat actor behavior to determine characteristics for the at least one additional dynamic honeypotted file;

generate at least one additional dynamic honeypotted file based on the analyzed information regarding access and usage of at least one dynamic honeypotted file, the at least one generated additional dynamic honeypotted file including at least one unique indicator embedded within the at least one additional generated dynamic honeypotted file;

deploy the at least one generated additional dynamic honeypotted file into the computing network;

monitor the deployed at least one generated additional dynamic honeypotted file for threat actor activity;

detect threat actor activity associated with the deployed at least one generated additional generated dynamic honeypotted file;

write information regarding the detection of the threat actor activity to a blockchain, the information including detailed data associated with the detection of the threat actor activity; and transmit a notification of the detection of the threat actor activity and the deployment of the at least one generated additional dynamic honeypotted file.

3. The computing platform of claim 2, wherein deployment of the at least one generated additional dynamic honeypotted file into the computing network comprises deployment into a sandbox of the computing network.

4. The computing platform of claim 3, wherein the memory stores additional computer readable instructions that, when executed by the at least one processor, cause the computing platform, after a specific predetermined time period, to terminate the sandbox to remove threat actor associated with the further threat activity, wherein terminating the sandbox removes the threat actor after isolating and analyzing patterns of the threat actor activity for additional insights.

5. The computing platform of claim 1, wherein the determined mapping of the location of the at least one generated dynamic honeypotted file further includes determination of location information of the computing device associated with the threat actor.

6. The computing platform of claim 1, wherein the memory stores additional computer readable instructions that, when executed by the at least one processor, cause the computing platform to:

generate, by a reporting system, a summary indicating results of the monitoring and detection; and transmit, to an administrator device, the summary and one or more commands directing the administrator device to display the summary, wherein sending the one or more commands directing the administrator device to display the summary causes the administrator device to display the summary.

7. The computing platform of claim 1, wherein the memory stores additional computer readable instructions that, when executed by the at least one processor, cause the computing platform to search for the unique identifier on the web locate the at least one generated dynamic honeypotted file.

8. The computing platform of claim 1, wherein deployment of the at least one generated dynamic honeypotted file into the computing network comprises deployment into a sandbox of the computing network, wherein terminating the sandbox removes the threat actor after isolating and analyzing patterns of the threat actor activity for additional insights.

9. A method comprising:

at a computing platform comprising at least one processor, a communication interface, and memory:

generating at least one dynamic honeypotted file, the at least one generated dynamic honeypotted file including at least one unique indicator embedded within the at least one generated dynamic honeypotted file, and wherein a machine learning model is trained using historical threat occurrence information including labelled data on whether access patterns correspond to threat actors;

deploying the at least one generated dynamic honeypotted file into a computing network;

monitoring the deployed at least one generated dynamic honeypotted file for threat actor activity;

detecting threat actor activity associated with the deployed at least one generated dynamic honeypotted file;

writing information regarding the detection of the threat actor activity to a blockchain, the information including detailed data associated with the detection of the threat actor activity; and transmitting a notification of the detection of the threat actor activity and the deployment of the at least one generated dynamic honeypotted file;

accessing the blockchain to retrieve information regarding access and usage of the generated dynamic honeypotted file;

analyzing with a machine learning model the retrieved blockchain information regarding access and usage of at least one generated dynamic honeypotted file;

determining by the machine learning model a mapping of locations of the at least one generated dynamic honeypotted file, wherein the mapping includes geolocation information derived from the detailed data in the blockchain for the at least one generated dynamic honeypotted file and the computing device associated with the threat actor; and transmitting a notification of the determined mapping of the location of the at least one generated dynamic honeypotted file.

10. The method of claim 9 further comprising at the computing platform comprising at least one processor, a communication interface, and memory:

accessing the blockchain to retrieve information regarding access and usage of the generated dynamic honeypotted file;

analyzing with a machine learning model the retrieved blockchain information regarding access and usage of at least one generated dynamic honeypotted file, wherein analyzing the retrieved blockchain information with the machine learning model identifies patterns in threat actor behavior to determine characteristics for the at least one additional dynamic honeypotted file;

generating at least one additional dynamic honeypotted file based on the analyzed information regarding access and usage of at least one dynamic honeypotted file, the at least one generated additional dynamic honeypotted file including at least one unique indicator embedded within the at least one generated additional dynamic honeypotted file;

deploying the at least one generated additional dynamic honeypotted file into the computing network;

monitoring the deployed at least one generated additional dynamic honeypotted file for threat actor activity;

detecting threat actor activity associated with the deployed at least one generated additional generated dynamic honeypotted file;

writing information regarding the detection of the threat actor activity to a blockchain, the information including detailed data associated with the detection of the threat actor activity; and transmitting a notification of the detection of the threat actor activity and the deployment of the at least one generated additional dynamic honeypotted file.

11. The method of claim 10, wherein deployment of the at least one generated additional dynamic honeypotted file into the computing network comprises deployment into a sandbox of the computing network, wherein terminating the sandbox removes the threat actor after isolating and analyzing patterns of the threat actor activity for additional insights.

12. The method of claim 11, wherein the memory stores additional computer readable instructions that, when executed by the at least one processor, cause the computing platform to after a specific predetermined time period, terminate the sandbox to remove threat actor associated with the further threat activity, wherein terminating the sandbox removes the threat actor after isolating and analyzing patterns of the threat actor activity for additional insights.

13. The method of claim 9, wherein the determined mapping of the location of the at least one generated dynamic honeypotted file further includes determination of location information of the computing device associated with the threat actor.

14. The method of claim 9, wherein the memory stores additional computer readable instructions that, when executed by the at least one processor, cause the computing platform to search for the unique identifier on the web locate the at least one generated dynamic honeypotted file.

15. One or more non-transitory computer-readable media storing instructions that, when executed by a computing platform comprising at least one processor, a communication interface, and memory, cause the computing platform to:

generate at least one dynamic honeypotted file, the at least one generated dynamic honeypotted file including at least one unique indicator embedded within the at least one generated dynamic honeypotted file, and wherein a machine learning model is trained using historical threat occurrence information including labelled data on whether access patterns correspond to threat actors;

deploy the at least one generated dynamic honeypotted file into a computing network;

monitor the deployed at least one generated dynamic honeypotted file for threat actor activity;

detect threat actor activity associated with the deployed at least one generated dynamic honeypotted file;

write information regarding the detection of the threat actor activity to a blockchain, the information including detailed data associated with the detection of the threat actor activity; and transmit a notification of the detection of the threat actor activity and the deployment of the at least one generated dynamic honeypotted file;

access the blockchain to retrieve information regarding access and usage of the generated dynamic honeypotted file;

analyze with a machine learning model the retrieved blockchain information regarding access and usage of at least one generated dynamic honeypotted file;

determine by the machine learning model a mapping of locations of the at least one generated dynamic honeypotted file, wherein the mapping includes geolocation information derived from the detailed data in the blockchain for the at least one generated dynamic honeypotted file and the computing device associated with the threat actor; and transmit a notification of the determined mapping of the location of the at least one generated dynamic honeypotted file.

16. The one or more non-transitory computer-readable storing instructions of claim 15, that when executed by the computing platform comprising at least one processor, a communication interface, and memory, further cause the computing platform to:

access the blockchain to retrieve information regarding access and usage of the generated dynamic honeypotted file;

analyze with a machine learning model the retrieved blockchain information regarding access and usage of at least one generated dynamic honeypotted file, wherein analyzing the retrieved blockchain information with the machine learning model identifies patterns in threat actor behavior to determine characteristics for the at least one additional dynamic honeypotted file;

generate at least one additional dynamic honeypotted file based on the analyzed information regarding access and usage of at least one dynamic honeypotted file, the at least one generated additional dynamic honeypotted file including at least one unique indicator embedded within the at least one generated additional dynamic honeypotted file;

deploy the at least one generated additional dynamic honeypotted file into the computing network;

monitor the deployed at least one generated additional dynamic honeypotted file for threat actor activity;

detect threat actor activity associated with the deployed at least one generated additional generated dynamic honeypotted file;

write information regarding the detection of the threat actor activity to a blockchain, the information including detailed data associated with the detection of the threat actor activity; and transmit a notification of the detection of the threat actor activity and the deployment of the at least one generated additional dynamic honeypotted file.

17. One or more non-transitory computer-readable of claim 15, wherein the determined mapping of the location of the at least one generated dynamic honeypotted file further includes determination of location information of the computing device associated with the threat actor.

* * * * *